(12) United States Patent
Kudo et al.

(10) Patent No.: US 7,227,286 B2
(45) Date of Patent: Jun. 5, 2007

(54) LONG LIFE FAN MOTOR

(75) Inventors: Naruhiko Kudo, Nagano (JP);
Hiromitsu Kuribayashi, Nagano (JP);
Toshiya Nishizawa, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 374 days.

(21) Appl. No.: 10/920,805

(22) Filed: Aug. 18, 2004

(65) Prior Publication Data

US 2005/0046284 A1 Mar. 3, 2005

(30) Foreign Application Priority Data

Aug. 25, 2003 (JP) ............... 2003-299686

(51) Int. Cl.
| | |
|---|---|
| H02K 9/06 | (2006.01) |
| H02K 9/04 | (2006.01) |
| H02K 7/14 | (2006.01) |
| F04D 25/02 | (2006.01) |
| F04D 25/08 | (2006.01) |

(52) U.S. Cl. .................. 310/58; 310/60 A; 417/423.7; 417/423.8

(58) Field of Classification Search ........ 310/58–60 A; 417/181, 170 R, 213 A, 244 R, 423.1, 423.7–423.9, 417/354

See application file for complete search history.

(56) References Cited

U.S. PATENT DOCUMENTS

| | | | | |
|---|---|---|---|---|
| 4,130,770 A | * | 12/1978 | Wrobel ..................... | 310/67 R |
| 4,679,990 A | | 7/1987 | Yamaura et al. | |
| 4,682,065 A | * | 7/1987 | English et al. ................ | 310/90 |
| 5,343,104 A | * | 8/1994 | Takahashi et al. ............ | 310/90 |
| 5,982,064 A | * | 11/1999 | Umeda et al. ................ | 310/90 |
| 6,309,180 B1 | | 10/2001 | Gilliland et al. | |
| 6,744,157 B2 | * | 6/2004 | Choi et al. .................... | 310/62 |
| 6,808,365 B2 | | 10/2004 | Poon et al. | |
| 2003/0151315 A1 | * | 8/2003 | Choi et al. .................... | 310/58 |
| 2003/0209946 A1 | * | 11/2003 | Huang et al. ................. | 310/58 |

FOREIGN PATENT DOCUMENTS

JP 10-191611 7/1998

* cited by examiner

Primary Examiner—Tran Nguyen
(74) Attorney, Agent, or Firm—Rankin, Hill, Porter & Clark LLP

(57) ABSTRACT

There is provided a fan motor in which an increase in the temperature of windings thereof is surpressed, thereby achieving a long life and high performance. Vent holes 33 for introducing air into a cup-like member 9 are formed in a bottom wall section 9b of a rotor 6. Air flowing direction adjusting ribs 37, which are arranged at intervals in a peripheral direction and each of which extends in a radial direction, are integrally provided on the inner surface of the bottom wall section 9 so that air flown out of exits 33b of the vent holes 33 is directed toward windings 3. In addition to the air flowing direction adjusting ribs 37, a plurality of air stirring ribs 39 for stirring the air inside the cup-like member 9 is arranged on the inner surface of the bottom wall section 9.

9 Claims, 2 Drawing Sheets

LONG LIFE FAN MOTOR

BACKGROUND OF THE INVENTION

The present invention relates to a fan motor employed for cooling an electronic device or the like.

Japanese Patent Application Laid-Open Publication No. 191611/1998 discloses a fan motor including a cup-like member and an impeller. The cup-like member has a cylindrical section with a plurality of rotor magnetic poles on an inner peripheral side thereof and a bottom wall section that blocks one end of the cylindrical section. The impeller includes a plurality of blades arranged outside the cylindrical section. In the fan motor of this type, in order to increase the volume of airflow and static pressure performance to aim at its higher performance, input power to windings is increased. The number of revolutions of the motor is thereby increased.

However, if the number of revolutions of the motor is increased as described above, the amount of heat generated in the windings increases. Then, when this heat generation causes the heat to be transferred to the bearings of the motor and the temperature of the bearings thus increases, the life of the bearings is reduced. For this reason, because of the need for suppressing the increase in the temperature of the bearings, the higher performance of the fan motor was conventionally hindered.

SUMMARY OF THE INVENTION

An object of the present invention is therefore to provide a fan motor that can reduce an increase in the temperature of members in a cup-like member therein and thereby can achieve higher performance of the fan motor.

Another object of the present invention is to provide a fan motor that can extend the life of the bearings of the fan motor by reducing the amount of heat transferred to the bearings.

Yet another object of the present invention is to provide a fan motor that can prevent foreign matters from entering the inside of the motor through vent holes therein.

A fan motor of the present invention includes a cap-like member and an impeller. The cup-like member has a cylindrical section including a plurality of rotor magnetic poles on an inner peripheral side thereof and a bottom wall section for blocking one end of the cylindrical section. The impeller comprises a plurality of blades arranged outside the cylindrical section. In the present invention, one or more vent holes for introducing air into the cup-like member are formed in the bottom wall section of the cup-like member. If the vent holes are so formed as in the present invention, the air is introduced into the cup-like member through the vent holes when the motor rotates. The air entered into the cup-like member is then discharged through the opening of the cup-like member. As a result, heat dissipation inside the cup-like member, more specifically, heat dissipation from the windings of the fan motor into the cup-like member becomes satisfactory, so that an increase in temperature of the members inside the cup-like member can be reduced. Higher performance of the fan motor can be thereby achieved.

A more specific motor on which the present invention aims at improvement includes a stator, an insulator, a plurality of windings, a circuit substrate, a cup-like member, an impeller, a rotary shaft, a bearing holding cylindrical section, a substrate receiving section and a housing section. The stator iron core has a plurality of projecting pole portions. The insulator is formed of an electrically insulating material and mounted on the stator iron core. A plurality of the windings are each provided at each of the projecting pole portions through the insulator The circuit substrate has a control circuit for controlling currents flowing through the windings mounted thereon. The cup-like member includes a cylindrical section having a plurality of rotor magnetic poles, each of which is made of a permanent magnet, on an inner peripheral side thereof, and a bottom wall section for blocking one end of the cylindrical section. The impeller includes a plurality of blades arranged outside the cylindrical section. The rotary shaft has one end thereof to which the bottom wall section of the cup-like member is fixed. One or more bearings for rotatably supporting the rotary shaft. The bearing holding cylindrical section has one end facing toward the bottom wall section. The stator iron core is mounted on an outer peripheral portion of the bearing holding cylindrical section. The bearing holding cylindrical section holds the one or more bearings inside thereof. The substrate receiving section is located at the other end of the bearing holding cylindrical section, for receiving the circuit substrate. The housing section surrounds an outer periphery of the blades; and a plurality of webs coupling the substrate receiving section to the housing section.

In the present invention, a plurality of vent holes for introducing air into the cup-like member are formed in the bottom wall section of the cup-like member. If the vent holes are so formed as in the present invention, the air is flown into the cup-like member through the vent holes when the motor rotates, so that the windings arranged in the cup-like member can be cooled. For this reason, the amount of heat transferred to the bearings is reduced. The life of the bearings can be thereby extended.

Each of the vent holes can be configured to include an entrance, an exit, and a passage formed between the entrance and the exit. In this case, the entrance is located forward in the rotational direction of the impeller, relative to the exit. The passage has a portion with the smallest cross sectional area between the entrance and the exit. With this arrangement, the speed of the air that passes through the vent holes can be increased, so that the cooling performance of the fan motor can be increased.

The opening area of the entrance of each vent hole can be formed to be wider than the opening area of the exit, and the passage can be so shaped that the air flowing through the vent hole changes its flow, in the proximity of the exit of the vent hole, toward more central area of the cup-like member. With this arrangement, it becomes easier for the air entered through the vent holes to flow in the direction toward the windings, so that the cooling effect of the fan motor can be increased.

Further, in the present invention, on the inner surface of the bottom wall section, ribs which are arranged at intervals in the peripheral direction and each of which extends in a radial direction can be integrally formed so that the air flown out of the exit may be directed toward the windings. With this arrangement, the flow of the air flown out of the exit is directed toward the windings. Thus, the windings can be directly cooled, so that an increase in the temperature of the windings can be effectively reduced.

Further, each of the ribs has a forward side surface facing toward a rotational direction of the impellers. The forward side surface includes the inclined surface which is so formed on the forward side surface as to incline from forward to backward in a rotational direction of the impellers. The angle of this inclined surface is so defined that the air flown from the exits is directed toward the windings. With this arrangement, the cooling efficiency of the windings is further improved.

Further, in the present invention, in addition to the ribs, a plurality of stirring ribs for stirring the air inside the cup-like member can be provided on the inner surface of the bottom wall section. With this arrangement, the air inside the cup-like member can be actively stirred to reduce a difference in temperature inside the cup-like member. Thus, the cooling performance of the fan motor is improved.

In the present invention, a first cylindrical section can be integrally formed with the inner surface of the bottom wall section of the cup-like member at a more radially inward position than the exits, and a second cylindrical section can be integrally formed with the insulator so that a small space is formed between the outer peripheral surface or inner peripheral surface of the first cylindrical section and the second cylindrical section. With this arrangement, the small space formed between the first cylindrical section and the second cylindrical section becomes a labyrinth, so that entry of foreign matters through the vent holes into the bearings when the impeller rotates can be prevented.

Still further, in the present invention, it is preferable that the end of the second cylindrical section abuts the inner surface of the bottom wall section when the rotary shaft displaces in an axis direction, thereby constituting a stopper section for restricting the amount of displacement of the rotary shaft. With this arrangement, even if the rotary shaft to which the cup-like member is fixed moves in the axis direction, and the cup-like member approaches the stator, the stopper section abuts the inner surface of the bottom wall section. Movement of the cup-like member toward the circuit substrate thus can be prevented. Accordingly, breakage of electronic components resulting from contact of electronic components on the circuit substrate with the end surface of the permanent magnet can be prevented.

According to the present invention, when the motor is rotated, air is introduced into the inside of the cup-like member, thereby permitting suppression of an increase in temperature of the windings. The amount of heat transferred to the bearings can be thereby reduced, so that the life of the bearings can be extended. As a result, even in a high-performance type fan motor with higher static pressure performance, of which the volume of airflow is increased, the life of the fan motor can be extended.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Figure 1:
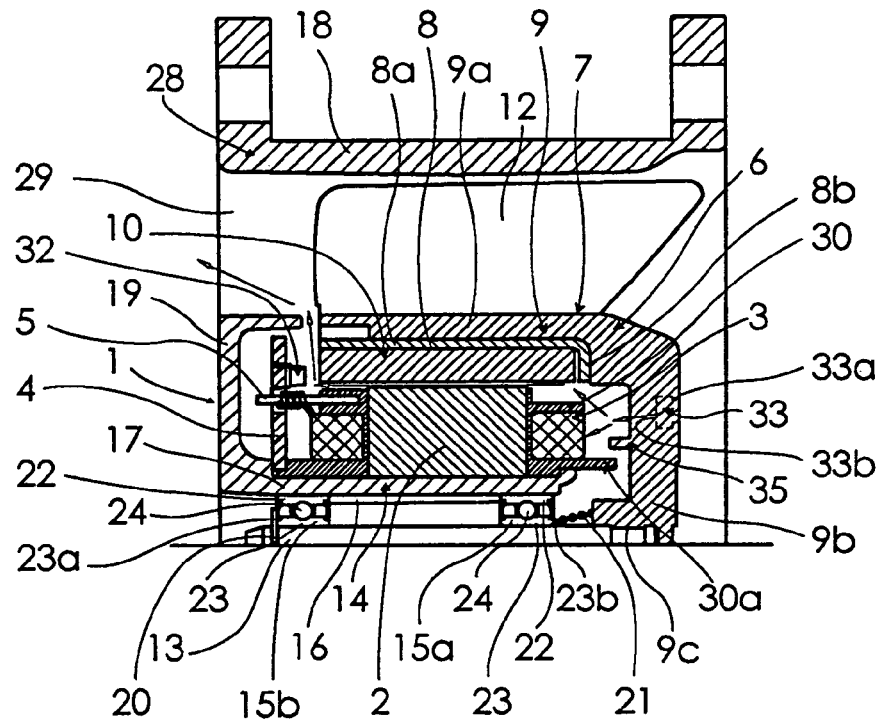
FIG. 1 is a vertical cross sectional view showing a half portion of a fan motor according to an embodiment of the present invention.

The best mode for carrying out the present invention will be described below with reference to the accompanying drawings. FIG. 1 is a vertical cross sectional view showing a half portion of a fan motor according to an embodiment of the present invention. Referring to FIG. 1, the fan motor according to this embodiment includes a stator 1, a circuit substrate 4, a stator side case 14, and a rotor 6. The stator 1 includes an iron core 2 constituted from a plurality of laminated silicon steel plates. The iron core 2 has a plurality of projecting pole portions arranged in a circumferential direction thereof. A winding is wound around each projecting pole portion of the iron core 2 through an insulator 30, thereby forming windings 3 as a whole. These projecting pole portions function as stator magnetic poles when the windings 3 are excited. The tip end of each projecting pole portion becomes the pole face of each stator magnetic pole.

The circuit substrate 4 is arranged on the side of the stator 1. On the circuit substrate 4, electronic components 32 constituting a control circuit for controlling currents flowing through the windings 3 are mounted. By winding the lead wire of each of the windings 3 around a terminal pin 5 soldered to the electrode on the circuit substrate 4, the windings 3 are electrically connected to the control circuit on the circuit substrate 4.

The stator case 14 is constituted from a bearing supporting cylindrical section 17, a housing section 18 for surrounding the outer periphery of blades 12 of the rotor 6, a substrate receiving section 19 for receiving and securing the circuit substrate 4, and a plurality of webs 29 coupling the substrate receiving section 19 to the housing section 18. In the inner peripheral portion of the bearing holding cylindrical section 17, a step section 16 that projects toward a rotary shaft 13, which will be described hereinafter, is formed. Two bearings 15a and 15b arranged on the inner peripheral portion of the bearing holding cylindrical section 17 abut both ends of the step section 16. The two bearings 15a and 15b are so-called ball bearings each constituted from an annular outer ring 22, an annular inner ring 23, and a plurality of spherical rolling members 24 arranged between the outer ring 22 and the inner ring 23, and rotatably supports the rotary shaft 13. An end face 23a of the inner ring 23 of the bearing 15b abuts a ring 20 fixed to the rotary shaft 13. An end face 23b of the inner ring 23 of the bearing 15a abuts the end surface of a coil spring 21. This arrangement causes the bearing 15a to be pressurized by the coil spring 21. A space between the outer ring 22 and the inner ring 23 is filled with a lubricant or a lubricating oil composed of a grease not shown. When the rotary shaft 13 rotates, the viscosity of the lubricant or the lubricating oil is reduced by frictional heating, so that around each of the rolling members 24, the film of the lubricating oil is formed.

Figure 2:
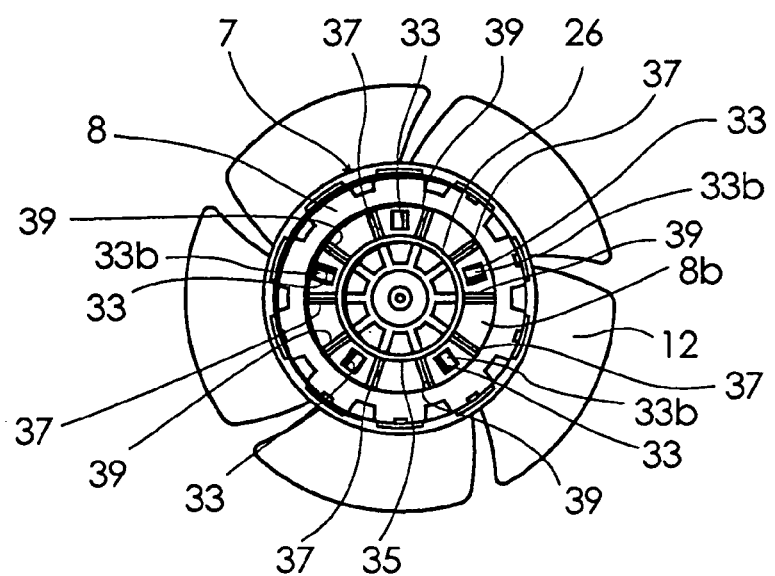
FIG. 2 is a back view of a rotor of the fan motor shown in FIG. 1.
Figure 3:
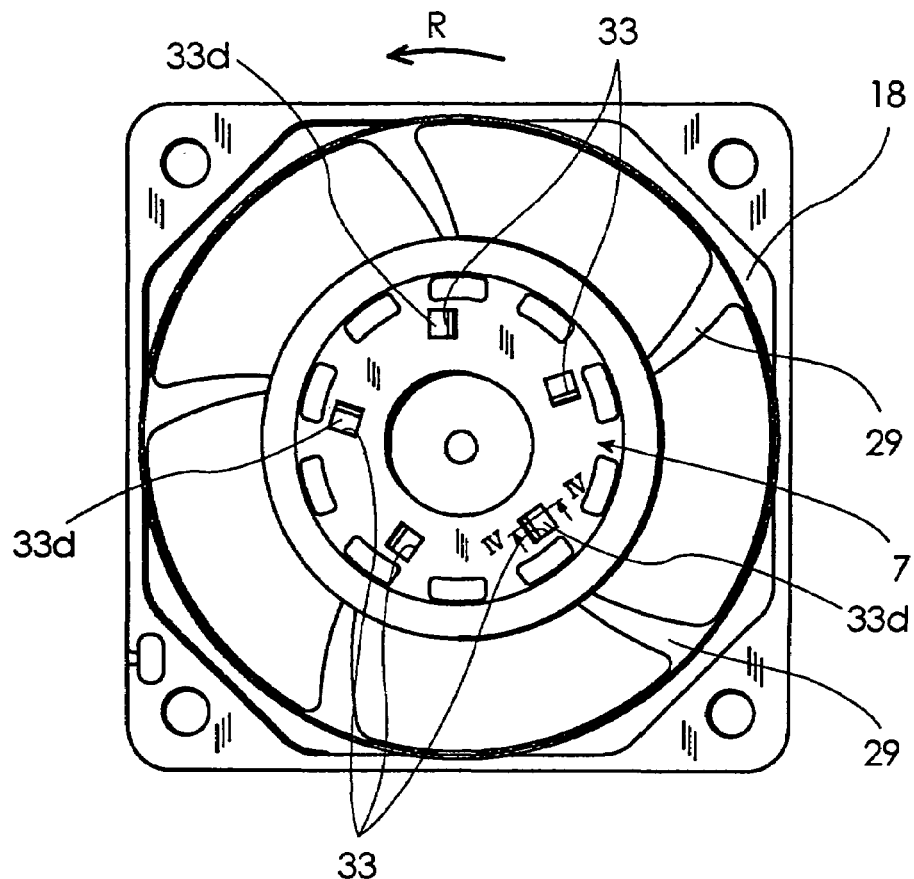
FIG. 3 is a front view of the fan motor shown in FIG. 1.

The rotor 6 has an impeller 7. FIG. 2 is a back view of the rotor 6 as seen from the stator 1, and FIG. 3 is a front view of the fan motor in this embodiment. The rotor 6 includes a cylindrical permanent magnet supporting member 8 formed of a magnetic material and a cup-like member 9 fitted on the outside of the permanent magnet supporting member 8. The permanent magnet supporting member 8 includes a cylindrical section 8a and an annular section 8b that extends in a radially inward direction from the end of the cylindrical section 8a. A plurality of rotor magnetic poles 10, each of which is made of a permanent magnet, are fixed to the inner peripheral surface of the cylindrical section 8. The cup-like member 9 includes a cylindrical section 9a and a bottom wall section 9b that blocks one end of the cylindrical section 9a. The permanent magnet supporting member 8 is fitted into the inner peripheral surface of the cylindrical section 9a for securing, and a plurality of blades 12 are integrally provided on the outer peripheral surface of the cylindrical section 9a.

The contour of the bottom wall section 9b of the cup-like member 9 is substantially circular. At the center of the bottom wall section 9b is formed a through hole 9c in which one end of the rotary shaft 13 is fitted for securing. In the bottom wall section 9b, five vent holes 33 that pass through the bottom wall section 9b to introduce air into the cup-like member 9 are formed. As shown in FIGS. 2 and 3, the five vent holes 33 are formed at equal intervals in a peripheral direction along a virtual circle with the center of the bottom wall section 9b as its center.

Figure 4:
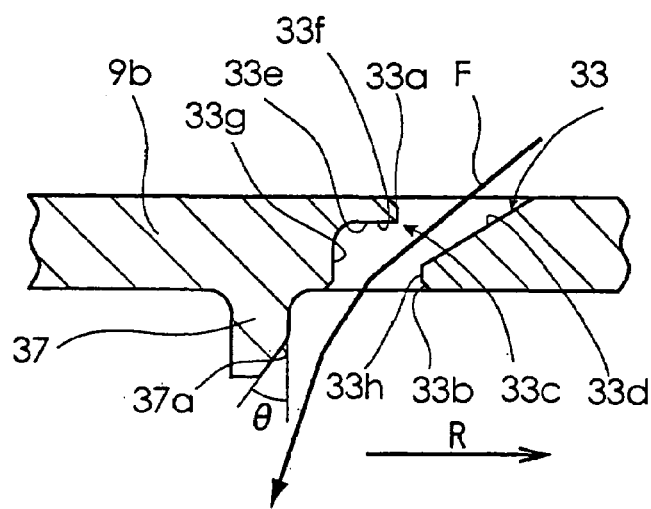
FIG. 4 is a sectional view cut through an IV—IV line in FIG. 3.

As shown in FIG. 4, which is a section cut through an IV—IV line in FIG. 3, each air vent 33 has an entrance 33a that opens towards an outside for introducing air, an exit 33b that opens towards the inside of the cup-like member 9 for discharging the air, and a passage 33c formed between the entrance 33a and the exit 33b. The entrance 33a and the exit 33b both take a rectangular shape. The entrance 33a is located forward in the rotational direction (arrow R) of the impeller 7 relative to the exit 33b. The opening area of the entrance 33a is wider than the opening area of the exit 33b.

Four wall surfaces surrounding the passage 33c include a front wall surface 33d and a back wall surface 33e. The front wall surface 33d can be seen through the entrance 33a when the bottom wall section 9b is seen from an outside. The back wall surface 33e can be seen through the exit 33b when the bottom wall section 9b is seen from an inside. The front wall surface 33d located forward in the rotational direction (arrow R) of the impeller 7 is inclined toward the exit 33b so that the front wall surface 33d extends from the front edge of the entrance 33a in the rotational direction to the exit 33b. The back wall surface 33e has a first wall surface section 33f and a second wall surface section 33g. The first wall surface section 33f extends in parallel with the inner surface of the bottom wall section 9b, and the second bottom wall surface section 33g is continuous with the first wall surface section 33f and extends toward the exit 33b in a direction orthogonal to the axis line of the rotary shaft. With this arrangement, the passage 33c has a narrowed-down portion 33h having the smallest cross sectional area between the entrance 33a and the exit 33b. Air, which has entered through the entrance 33a, flows along the front wall surface 33d as shown with an arrow F. Then, after passing through the narrowed-down portion 33h, the air is accelerated. Then, the air strikes the second wall surface section 33g and flows out through the exit 33b.

As shown in FIG. 2, on the inner surface of the bottom wall section 9b, a first cylindrical section 35, five air flowing direction adjusting ribs 37, and five air stirring ribs 39 are integrally formed. The first cylindrical section 35 projects toward the stator 1 and is also concentrically formed with the rotary shaft 13. The first cylindrical section 35 is located in a more radially inward position than the five exits 33b. As shown in FIG. 1, the first cylindrical section 35 forms a labyrinth structure in a small space between the inner peripheral surface of the first cylindrical section 35 and a second cylindrical section 30a integrally formed with the insulator 30. By forming this labyrinth structure, during rotation of the impeller 7, entry of dust and dirt through vent holes 33 into the bearing 15a and adhesion of the dust and the dirt to the bearing 15a can be prevented. Further, in this embodiment, the end of the second cylindrical section 30a contacts the inner surface of the bottom wall section 9b when the rotary shaft 13 displaces in the axis line direction, thereby constituting a stopper section for restricting the amount of displacement of the rotary shaft 13.

As shown in FIG. 2, the air flowing direction adjusting ribs 37 and the air stirring ribs 39 extend radially with respect to the rotary shaft 13 and are alternately arranged in the peripheral direction at substantially equal intervals. Further, the dimensions of projection of the air flowing direction adjusting ribs 37 and the air stirring ribs 39 are smaller than the dimensions of projection of the first cylindrical section 35. Then, vent holes 33 are formed in five of ten spaces formed between the air flowing direction adjusting ribs 37 and air stirring ribs 39 adjacent to each other in the bottom wall section 9b, in such a way that each air vent is located in every other space.

The air flowing direction adjusting ribs 37 are formed backward in the rotational direction (arrow R) of the impeller relative to the exits 33b so that the air flown out of the exits 33b of the vent holes 33 is directed toward the windings 3 as shown with the arrow F in FIG. 4. Further, each of the air flowing direction adjusting ribs 37 has a forward side surface facing toward a rotational direction of the impellers 7. The forward side surface includes the inclined surface 37a. The inclined surface 37a is so formed as to incline from forward to backward in the rotational direction (arrow R) of the impellers 7. An angle θ at which the inclined surfaces 37a are inclined is defined to be 10 to 45 degrees so that the air flown out of the exits 33b is directed toward the windings 3. The air stirring ribs 39 are so arranged that the vent holes 33 are located between the air stirring ribs 39 and the air flowing direction adjusting ribs 37, and function to stir the air inside the cup-like member 9.

In the fan motor in this embodiment, the air entered into the fan motor through the vent holes 33 cools the windings 3 and then passes through the space between the stator 1 and the rotor 6, as shown with the arrow in FIG. 1. Then, the air is discharged from the space between the substrate receiving section 19 and the cylindrical section 9a of the cup-like member 9. For this reason, according to the fan motor in this embodiment, an increase in temperature of the windings 3 can be suppressed. The amount of heat transferred to the bearings 15a and 15b can be thereby reduced, so that an increase in the temperature of the bearings 15a and 15b can be suppressed.

The fan motor in this embodiment and a fan motor without the vent holes 33 but having the same structure as that of the fan motor in this embodiment for comparison were fabricated. Then, the respective fan motors are operated at the rated power at room temperature and with no load, so that a temperature increase value (K) for each of the windings and the bearing at the side of the cup-like member was measured. Table 1 indicates the results of measurement.

TABLE 1

|  | Winding (K) | Bearing at the side of the cup-like member (K) |
| --- | --- | --- |
| Embodiment | 23 | 25 |
| Comparison example | 32 | 34 |

As shown in Table 1, it can be seen that in the fan motor in this embodiment, an increase in temperature of both of the windings and the bearing can be more reduced than in the fan motor without the vent holes 33 in the comparison example.

Further, the present invention is not limited to these embodiments, but variations and modifications may be made without departing from the scope of the present invention.

What is claimed is:

1. A fan motor comprising:
   a cup-like member having a cylindrical section including a plurality of rotor magnetic poles on an inner peripheral side thereof and a bottom wall section for blocking one end of said cylindrical section;
   an impeller comprising a plurality of blades arranged outside said cylindrical section; wherein
   one or more vent holes for introducing air into said cup-like member are formed in said bottom wall section of said cup-like member;
   each of said vent holes comprises an entrance, an exit, and a passage formed between said entrance and said exit;
   said entrance is located forward in a rotational direction of said impeller relative to said exit; and
   said passage has a portion with a smallest cross sectional area between said entrance and said exit.

2. The fan motor according to 1, wherein an opening area of said entrance is wider than an opening area of said exit; and
   said passage is so shaped that air flowing through said vent hole changes flow thereof in proximity of said exit of said vent hole, toward a more central area of said cup-like member.

3. A fan motor comprising:
   a stator iron core having a plurality of projecting pole portions;
   an insulator formed of an electrically insulating material and mounted on said stator iron core;
   a plurality of windings each provided at each of said projecting pole portions through said insulator;
   a circuit substrate with a control circuit for controlling currents flowing through said windings mounted thereon;
   a cup-like member comprising a cylindrical section having a plurality of rotor magnetic poles, each of which is made of a permanent magnet, on an inner peripheral side thereof, and a bottom wall section for blocking one end of said cylindrical section;
   an impeller comprising a plurality of blades arranged outside said cylindrical section;
   a rotary shaft with one end thereof fixed to said bottom wall section of said cup-like member;
   one or more bearings for rotatably supporting said rotary shaft;
   a bearing holding cylindrical section having one end thereof facing toward said bottom wall section and with said stator iron core mounted on an outer peripheral portion thereof, for holding said one or more bearings inside thereof;
   a substrate receiving section located at the other end of said bearing holding cylindrical section, for receiving said circuit substrate;
   a housing section surrounding an outer periphery of said blades; and
   a plurality of webs coupling said substrate receiving section to said housing section;
   wherein a plurality of vent holes for introducing air into said cup-like member are formed in said bottom wall section of said cup-like member;
   each of said vent holes comprises an entrance, an exit, and a passage formed between said entrance and said exit;
   said entrance is located forward in a rotational direction of said impeller relative to said exit; and
   said passage has a portion with a smallest cross sectional area between said entrance and said exit.

4. The fan motor according to claim 3, wherein an opening area of said entrance is wider than an opening area of said exit; and
   said passage is so shaped that air flowing through said vent hole changes flow thereof in proximity of said exit of said vent hole, toward a more central area of said cup-like member.

5. The fan motor according to claim 3, wherein on an inner surface of said bottom wall section, ribs arranged at intervals in a peripheral direction and each extending in a radial direction are integrally provided so that air flowing out of said exit is directed toward said windings.

6. The fan motor according to claim 5, wherein each of said ribs has a forward side surface facing toward a rotational direction of said impellers, said forward side surface includes an inclined surface which is so formed as to incline from forward to backward in a rotational direction of said impellers; and
   an angle of said inclined surface is so defined that air flowing out of said exit is directed toward said windings.

7. The fan motor according to claim 5, wherein in addition to said ribs, a plurality of stirring ribs for stirring the air inside said cup-like member are arranged on said inner surface of said bottom wall section.

8. The fan motor according to claim 5, wherein a first cylindrical section is integrally formed on the inner surface of said bottom wall section of said cup-like member at a more radially inward position than exits of said vent holes; and
   a second cylindrical section is integrally formed with said insulator so as to form a small space between an outer peripheral surface or an inner peripheral surface of said first cylindrical section and said second cylindrical section.

9. The fan motor according to claim 8, wherein an end of said second cylindrical section abuts the inner surface of said bottom wall section when said rotary shaft displaces in an axial direction, thereby constituting a stopper section for restricting an amount of displacement of said rotary shaft.

* * * * *